L. A. POWERS.
Rakes.
No. 144,791.        Patented Nov. 18, 1873.
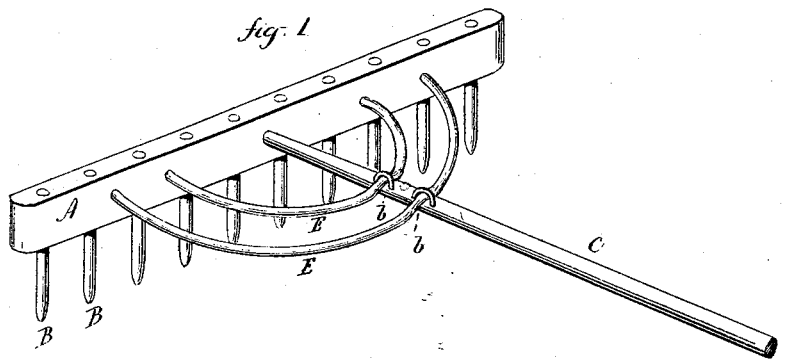
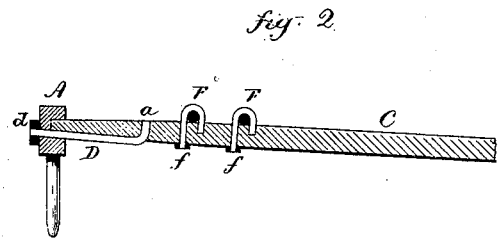

UNITED STATES PATENT OFFICE.

LUTHER A. POWERS, OF WEST MERIDEN, CONNECTICUT.

IMPROVEMENT IN RAKES.

Specification forming part of Letters Patent No. 144,791, dated November 18, 1873; application filed August 27, 1873.

*To all whom it may concern:*

Be it known that I, LUTHER A. POWERS, of West Meriden, in the county of New Haven and State of Connecticut, have invented a new Improvement in Rakes; and I do hereby declare the following, when taken in connection with the accompanying drawings and the letters of reference marked thereon, to be a full, clear, and exact description of the same, and which said drawings constitute part of this specification, and represent, in—

Figure 1, a perspective view, and in Fig. 2 a longitudinal central section.

This invention relates to an improvement in the manner of attaching the head to the handle of a rake, the object being to more readily repair the rake, as well as to make it stronger than the usual construction; and the invention consists in attaching the braces to the handle by means of a hooked bolt looping over the braces, the braces passing over or under the handle, and the head secured to the handle by a bolt through the head turned up into the handle, as more fully hereinafter described.

A is the head, provided with teeth B in the usual manner; C, the handle, also of the usual form, running into the head at the center. Through the head a bolt, D, extends—one end, $a$, turned up through a perforation in the handle, the other fitted with a nut, $d$, outside the head, so that by the turning on of the nut the head may be drawn onto the handle; or, removing the nut, the head may be taken from the handle. E E are braces, one or more, made, preferably, from wire, the two ends secured in the head, curved around over or under the handle, and at the point where they cross the handle a transverse bend, $b$, is formed; and through the handle a hooked bolt, F, is arranged, the hook encircling the braces; and, by means of the nuts $f$, the hooks are drawn down to bind the braces on the handle, the curve $b$ preventing any tendency to a lateral movement. By removing the nuts $f$, the braces are disengaged from the handle.

I claim as my invention—

The herein-described rake, consisting of the head A, handle C, and braces E, when the said handle is secured to the head by the hooked bolt D, and the braces to the handle by the hooked bolts F, all as set forth.

LUTHER A. POWERS.

Witnesses:
T. F. BAILEY,
WILBUR F. DAVIS.